United States Patent
Myers et al.

(10) Patent No.: US 11,097,851 B1
(45) Date of Patent: Aug. 24, 2021

(54) SYSTEM AND METHOD TO MOMENTARILY SWITCH SVS MODE

(71) Applicant: Rockwell Collins, Inc., Cedar Rapids, IA (US)

(72) Inventors: Matt Myers, Cedar Rapids, IA (US); Jason Davis, Marengo, IA (US); Patrick D. McCusker, Walker, IA (US); Daniel Y. Chiew, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/687,858

(22) Filed: Nov. 19, 2019

(51) Int. Cl.
| | |
|---|---|
| *B64D 3/00* | (2006.01) |
| *B64D 43/00* | (2006.01) |
| *G08G 5/06* | (2006.01) |
| *H04Q 9/00* | (2006.01) |
| *G06F 3/0488* | (2013.01) |
| *G08G 5/00* | (2006.01) |

(52) U.S. Cl.
CPC ......... *B64D 43/00* (2013.01); *G06F 3/04883* (2013.01); *G08G 5/0021* (2013.01); *G08G 5/065* (2013.01); *H04Q 9/00* (2013.01)

(58) Field of Classification Search
CPC .. B64D 43/00; G06F 3/04883; G08G 5/0021; G08G 5/065; H04Q 9/00
See application file for complete search history.

(56) References Cited

U.S. PATENT DOCUMENTS

| | | | |
|---|---|---|---|
| 7,286,062 | B2 | 10/2007 | Feyereisen et al. |
| 7,375,678 | B2 | 5/2008 | Feyereisen et al. |
| 7,499,794 | B1 | 3/2009 | Bailey et al. |
| 7,965,223 | B1 | 6/2011 | McCusker |
| 8,159,416 | B1 | 4/2012 | Yum et al. |
| 8,193,948 | B1 | 6/2012 | Shapiro et al. |

(Continued)

FOREIGN PATENT DOCUMENTS

| | | |
|---|---|---|
| EP | 2610590 B1 | 10/2015 |
| EP | 3446984 A1 | 2/2019 |
| EP | 3476743 A1 | 5/2019 |

OTHER PUBLICATIONS

"G3X Pilot's Guide," Apr. 29, 2019 (Apr. 29, 2019), XP055790149, Retrieved from the Internet: URL:https://static.garmin.com/pumac/190-01 115-00_q.pdf [retrieved on Mar. 25, 2021].

(Continued)

*Primary Examiner* — Peter D McLoone
(74) *Attorney, Agent, or Firm* — Suiter Swantz pc llo

(57) ABSTRACT

A system may include a display and a processor communicatively coupled to the display. The processor may be configured to: output, to the display, a synthetic vision system (SVS) taxi mode exocentric view of an aircraft when the aircraft is performing taxi operations and when the aircraft is on ground; receive a user input to switch the output of the SVS taxi mode exocentric view to an SVS flight mode egocentric view from the aircraft; and switch the output of the SVS taxi mode exocentric view to output, to the display, the SVS flight mode egocentric view when the aircraft is performing taxi operations and when the aircraft is on ground based at least on the user input to switch from the SVS taxi mode exocentric view to the SVS flight mode egocentric view.

11 Claims, 5 Drawing Sheets

(56) References Cited

U.S. PATENT DOCUMENTS

| | | |
|---|---|---|
| 8,433,459 B2 | 4/2013 | Michel et al. |
| 8,698,654 B2 | 4/2014 | He |
| 8,786,467 B2 | 7/2014 | Clark et al. |
| 9,105,115 B2 * | 8/2015 | Feyereisen ............... G06T 11/00 |
| 9,189,964 B1 | 11/2015 | Rathinam et al. |
| 9,347,794 B1 | 5/2016 | Tiana et al. |
| 9,517,844 B2 | 12/2016 | Khatwa et al. |
| 9,786,467 B2 | 10/2017 | Iijima |
| 10,234,303 B1 * | 3/2019 | Chandrashekarappa .................... G08G 5/0021 |
| 2010/0283636 A1 | 11/2010 | Clark et al. |
| 2012/0194556 A1 | 8/2012 | Schmitt et al. |
| 2019/0004318 A1 | 1/2019 | Descheemaeker et al. |
| 2019/0056611 A1 * | 2/2019 | Marhefka ........... G02F 1/13306 |
| 2019/0066523 A1 | 2/2019 | Pesik et al. |
| 2020/0116521 A1 * | 4/2020 | Barber .................. B64D 43/00 |

OTHER PUBLICATIONS

Extended Search Report for European Application No. 20208733.4 dated May 6, 2021, 9 pages.

* cited by examiner

SYSTEM AND METHOD TO MOMENTARILY SWITCH SVS MODE

BACKGROUND

The traditional synthetic vision system (SVS) scenery, which is used as a background for a primary flight display, provides an egocentric view of an area in front of an aircraft. This provides a relatively narrow field of view which is sufficient for take-off, flight, and landing operations; however, this view is not ideal for taxiing to a takeoff point on a runway.

SUMMARY

In one aspect, embodiments of the inventive concepts disclosed herein are directed to a system. The system may include a display and a processor communicatively coupled to the display. The processor may be configured to: output, to the display, a synthetic vision system (SVS) taxi mode exocentric view of an aircraft when the aircraft is performing taxi operations and when the aircraft is on ground; receive a user input to switch the output of the SVS taxi mode exocentric view to an SVS flight mode egocentric view from the aircraft; and switch the output of the SVS taxi mode exocentric view to output, to the display, the SVS flight mode egocentric view when the aircraft is performing taxi operations and when the aircraft is on ground based at least on the user input to switch from the SVS taxi mode exocentric view to the SVS flight mode egocentric view. The display may be configured to: display the SVS taxi mode exocentric view when the aircraft is performing taxi operations and when the aircraft is on ground; and display the SVS flight mode egocentric view based at least on the user input to switch from the SVS taxi mode exocentric view to the SVS flight mode egocentric view.

In a further aspect, embodiments of the inventive concepts disclosed herein are directed to a method. The method may include: outputting, to a display, a synthetic vision system (SVS) taxi mode exocentric view of an aircraft when the aircraft is performing taxi operations and when the aircraft is on ground; receiving a user input to switch the output of the SVS taxi mode exocentric view to an SVS flight mode egocentric view from the aircraft; switching the output of the SVS taxi mode exocentric view to output, to the display, the SVS flight mode egocentric view when the aircraft is performing taxi operations and when the aircraft is on ground based at least on the user input to switch from the SVS taxi mode exocentric view to the SVS flight mode egocentric view; displaying the SVS taxi mode exocentric view when the aircraft is performing taxi operations and when the aircraft is on ground; and displaying the SVS flight mode egocentric view based at least on the user input to switch from the SVS taxi mode exocentric view to the SVS flight mode egocentric view.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
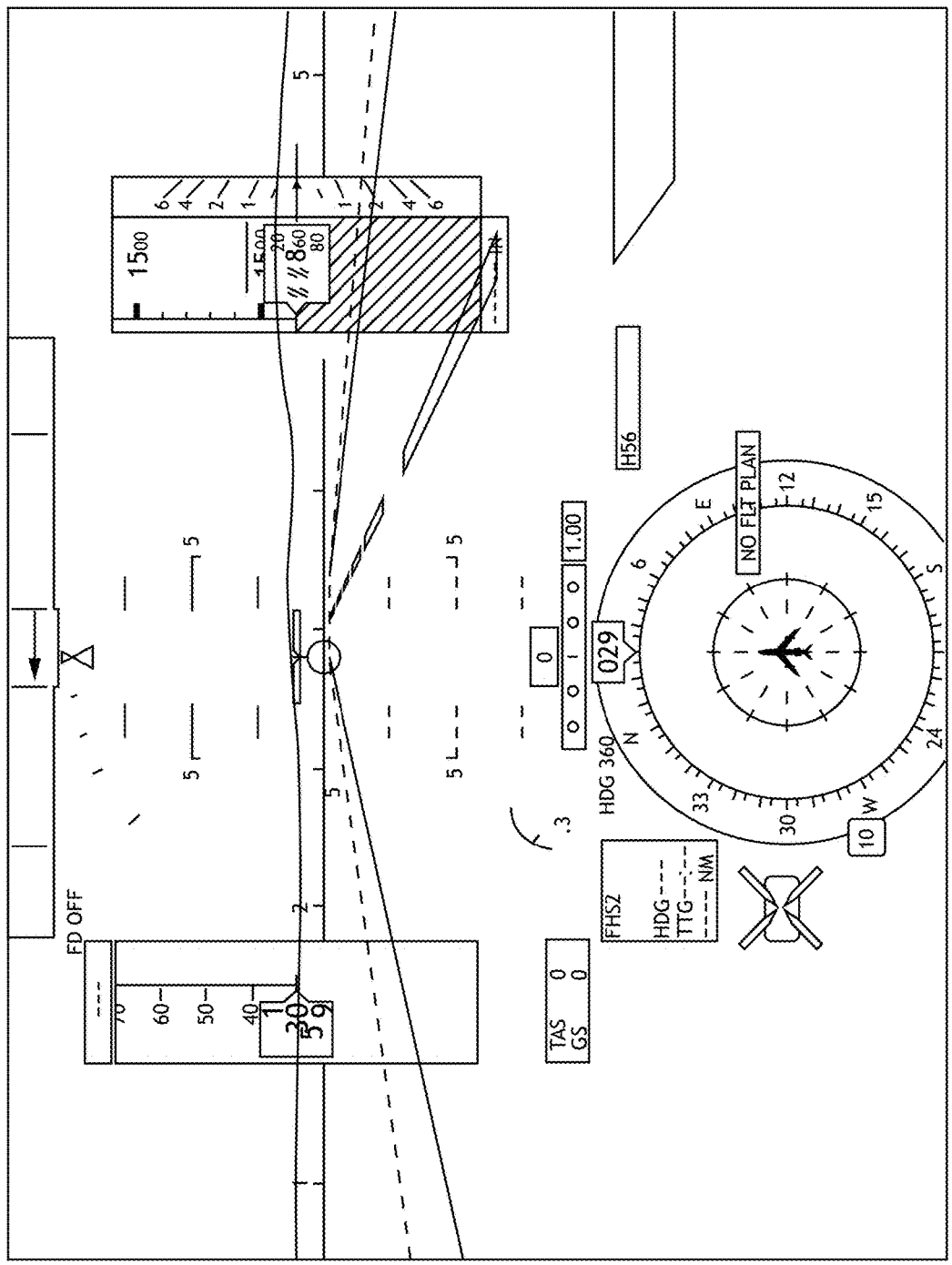
FIG. 1 is a view of an exemplary embodiment of an SVS flight mode egocentric view according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system and a method configured to display an SVS taxi mode exocentric view when an aircraft is performing taxi operations and when the aircraft is on ground and to display an SVS flight mode egocentric view based at least on a user input to switch from the SVS taxi mode exocentric view to the SVS flight mode egocentric view.

Referring now to FIG. 1, an exemplary embodiment of an SVS flight mode egocentric view 102 according to the inventive concepts disclosed herein is depicted. The SVS flight mode egocentric view 102 may be used as a background for a primary flight display (PFD) (e.g., 306 or 402) providing an egocentric view of the area in front of the aircraft (e.g., 300). The SVS flight mode egocentric view 102 may provide a relatively narrow (e.g., as compared to an SVS taxi mode exocentric view 202) field of view, which may be sufficient for take-off, flight, and landing operations. The SVS flight mode egocentric view 102 may be used during an SVS flight mode. The SVS flight mode egocentric view 102 may include primary flight display symbology overlaid on the SVS flight mode egocentric view 102.

Figure 2:
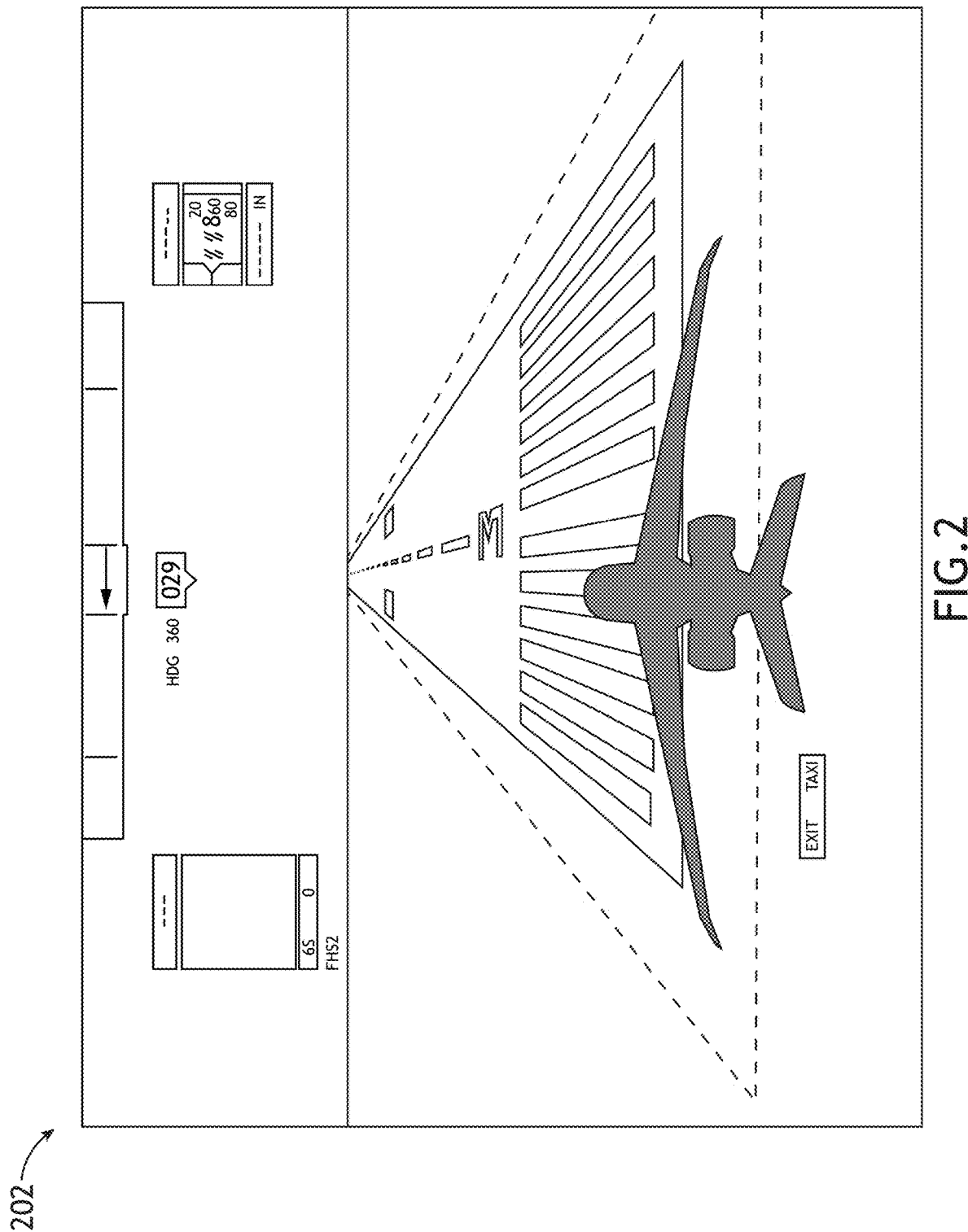
FIG. 2 is a view of an exemplary embodiment of an SVS taxi mode exocentric view according to the inventive concepts disclosed herein.

Referring now to FIG. 2, an exemplary embodiment of an SVS taxi mode exocentric view 202 according to the inventive concepts disclosed herein is depicted. The SVS taxi mode exocentric view 202 may provide a wider field of view than the SVS flight mode egocentric view 102 for use during taxi operations. The SVS taxi mode exocentric view 202 may be used during an SVS taxi mode. The SVS taxi mode exocentric view 202 may improve support for taxi operations. The SVS taxi mode exocentric view 202 may provide an exocentric view of an area surrounding the aircraft (e.g., 300). The eye-point of the synthetic imagery for the SVS taxi mode exocentric view 202 may be above and behind the aircraft. The SVS taxi mode exocentric view 202 may expand the field of view of the synthetic scenery. The location of the aircraft (e.g., 300) within this scene may be represented by an aircraft outline projected onto the ground in the synthetic scene with the aircraft within the outline shown as transparent or translucent.

The SVS taxi mode exocentric view 202 may declutter much of the PFD symbology to emphasize the synthetic view of the world around the aircraft (e.g., 300) such that the SVS taxi mode exocentric view 202 may have less of the PFD symbology overlaid on the SVS taxi mode exocentric view 202 than the SVS flight mode egocentric view 102. Because of the decluttering of PFD symbology, the SVS taxi mode exocentric view 202 should only be used for taxi operations. The PFD should return to the SVS flight mode egocentric view 102 before or as the aircraft (e.g., 300) begins a take-off run. The PFD may have logic to determine when automatic transitions between Flight Mode and Taxi Mode may occur. This ensures the PFD is returned to a proper configuration prior to take-off.

A PFD format control performed by at least one processor (e.g., at least one processor 404 and/or at least one processor 502) onboard the aircraft may provide the means to enable or disable SVS taxi mode operations (e.g., via a configuration selection of "Auto" or "Off"). The Auto selection may allow the PFD logic to determine when the PFD may show the SVS flight mode egocentric view 102 or the SVS taxi mode exocentric view 202. The Off selection may ensure that the SVS flight mode egocentric view 102 is always presented during taxi operations (within the logic that determines when SVS is operational or in a fault state). The flight crew may manually configure the PFD to SVS Taxi Mode Auto/Off via a menu selection on the PFD, via independent hardware or software control panels, or other user interfaces (e.g., an eye tracking user interface or a voice recognition system). The user interface for configuring SVS Taxi Mode Auto/Off may be designed to be selected once per flight during a normal start up routine.

In some embodiments, the crew may select SVS Taxi Mode to Auto during a pre-flight checklist. From this point forward, the system may decide when to present the SVS Taxi Mode or the SVS Flight Mode. The SVS may be in Taxi Mode from the time the aircraft leaves the ramp or gate until beginning a take-off run. However, typically, there are at least two points in the taxi operation when the crew should verify the integrity of PFD symbology that may be decluttered during SVS Taxi Mode operations. Thus, it would be desired for the crew to have a means to force the PFD into SVS Flight Mode so that the crew can complete the operational checks of the PFD and then return to SVS Taxi Mode. Typically, these operational checks only take a few seconds and occur during periods of high crew workload. Using the normal means of changing the PFD configuration between SVS Taxi Mode Auto/Off may be undesirable in these conditions.

Some embodiments include a switch (e.g., a momentary switch 312) that changes (e.g., momentarily changes for a duration of a user input, such as a press and hold event) the PFD image from the SVS taxi mode exocentric view 202 to the SVS flight mode egocentric view 102 when the switch is engaged and then returns the PFD image to the SVS taxi mode exocentric view 202 when the switch is disengaged (e.g., released). In some embodiments, this switch does not alter the Auto configuration of the PFD format selections. The PFD can remain in the SVS Taxi Mode Auto configuration.

Figure 3:
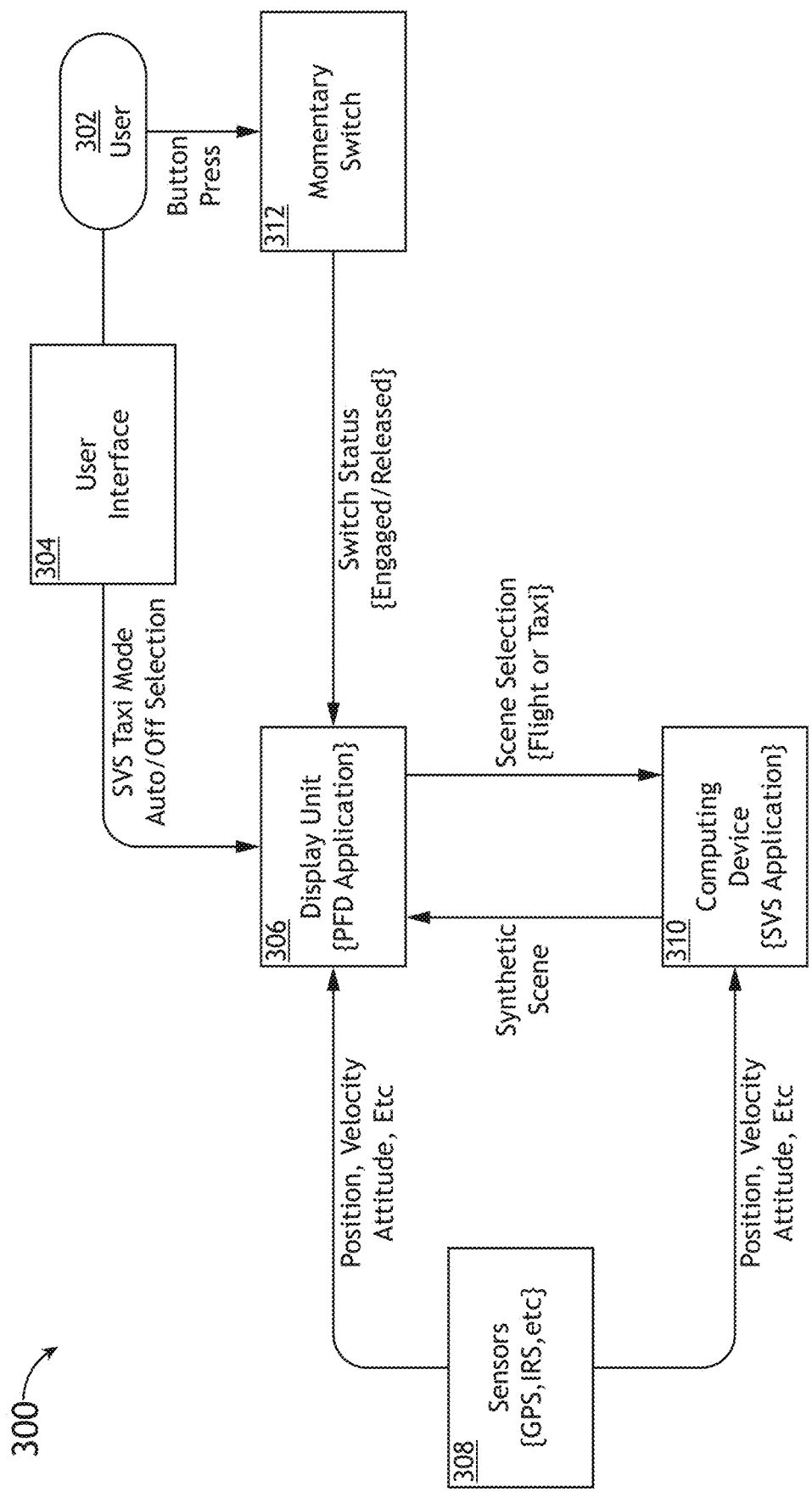
FIG. 3 is a view of an exemplary embodiment of a system according to the inventive concepts disclosed herein.
Figure 5:
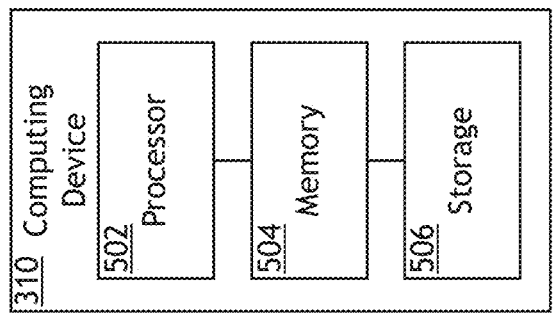
FIG. 5 is a view of an exemplary embodiment of a computing device of the system of FIG. 3 according to the inventive concepts disclosed herein.
Figure 4:
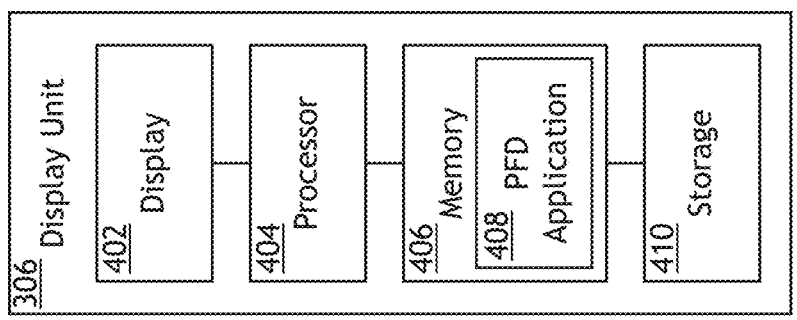
FIG. 4 is a view of an exemplary embodiment of a display unit computing device of the system of FIG. 3 according to the inventive concepts disclosed herein.

Referring now to FIG. 3-5, an exemplary embodiment of a system according to the inventive concepts disclosed herein is depicted. In some embodiments, the system may include the aircraft 300, which may include at least one user 302, at least one user interface 304, at least one display unit computing device 306, sensors 308, at least one computing device 310, and/or at least one switch (e.g., momentary switch 312), some or all of which may be communicatively coupled at any given time. In some embodiments, the at least one display unit computing device 306 and/or the at least one computing device 310 may be implemented as a single computing device or any number of computing devices configured to perform any or all of the operations disclosed throughout.

The user 302 may be a pilot or crew member. The user 302 may be configured to interface with the system via the at least one user interface 304 and/or the switch (e.g., the momentary switch 312), for example, to select SVS taxi mode to be Auto or Off and/or to switch the PFD image from the SVS taxi mode exocentric view 202 to the SVS flight mode egocentric view 102. The at least one user interface 304 may be implemented as any suitable user interface, such as a touchscreen (e.g., of the display unit computing device 306 and/or another display unit), a multipurpose control panel, a cursor control panel, a keyboard, a mouse, a trackpad, a button, a switch, an eye tracking system, and/or a voice recognition system. In some embodiments, the at least one user interface 304 may include the switch (e.g., the momentary switch 312). The user interface 304 may be configured to receive a user selection and to output the user selection to a computing device (e.g., the display unit computing device 306). For example, a pilot of the aircraft 300 may be able to make an auto or off selection for a SVS taxi mode, wherein the auto selection of the SVS taxi mode enables at least one processor to automatically transition between the SVS taxi mode exocentric view 202 and the SVS flight mode egocentric view 102, wherein the off selection of the SVS taxi mode enables the at least one processor to only output the SVS flight mode egocentric view 102.

The display unit computing device 306 may be implemented as any suitable computing device, such as a PFD computing device. As shown in FIG. 4, the display unit computing device 306 may include at least one display 402, at least one processor 404, at least one memory 406, and/or storage 410, some or all of which may be communicatively coupled at any given time. For example, the at least one processor 404 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 404 may include a CPU and a GPU configured to perform (e.g., collectively perform) any of the operations disclosed throughout. The processor 404 may be configured to run various software applications (e.g., a PFD application 408) or computer code stored (e.g., maintained) in a non-transitory computer-readable medium (e.g., memory 406 and/or storage 410) and configured to execute various instructions or operations. The processor 404 may be configured to perform any or all of the operations disclosed throughout. For example, the processor 404 may be configured to: output, to the at least one display 402, an SVS taxi mode exocentric view 202 of an aircraft 300 when the aircraft 300 is performing taxi operations and when the aircraft 300 is on ground; receive a user input (e.g., from the switch (e.g., the momentary switch 312)) to switch the output of the SVS taxi mode exocentric view 202 to an SVS flight mode egocentric view 102 from the aircraft 300; switch the output of the SVS taxi mode exocentric view 202 to output, to the at least one display 402, the SVS flight mode egocentric view 102 when the aircraft 300 is performing taxi operations and when the aircraft 300 is on ground based at least on the user input (e.g., a press and hold event) to switch from the SVS taxi mode exocentric view 202 to the SVS flight mode egocentric view 102; and/or switch the output of the SVS flight mode egocentric view back to the SVS taxi mode exocentric view once the duration of the user input is complete. The display 402 may be configured to: display the SVS taxi mode exocentric view 202 when the aircraft is performing taxi operations and when the aircraft is on ground; and/or display the SVS flight mode egocentric view 102 based at least on the user input (e.g., via the switch (e.g., the momentary switch 312)) to switch from the SVS taxi mode exocentric view 202 to the SVS flight mode egocentric view 102, such as for a duration of the user input.

The sensors 308 may be any suitable sensors, such as at least one global positioning system (GPS) sensor, at least one inertial reference system (IRS) sensor, and/or any other sensors commonly installed in aircraft. The sensors 308 may be configured to output sensor data (e.g., position, velocity, and/or attitude) to some or all of the computing devices (e.g., 306 and/or 310).

The at least one computing device 310 may be implemented as any suitable computing device, such as an SVS computing device. As shown in FIG. 5, the computing device 310 may include at least one processor 502, at least one memory 504, and/or storage 506, some or all of which may be communicatively coupled at any given time. For example, the at least one processor 502 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 502 may include a CPU and a GPU configured to perform (e.g., collectively perform) any of the operations disclosed throughout. The processor 502 may be configured to run various software applications (e.g., an SVS application) or computer code stored (e.g., maintained) in a non-transitory computer-readable medium (e.g., memory 504 and/or storage 506) and configured to execute various instructions or operations. The processor 502 of the computing device 310 may be configured to perform any or all of the operations disclosed throughout. For example, the processor 502 of the computing device 310 may be configured to: output, to the at least one display 402, an SVS taxi mode exocentric view 202 of an aircraft 300 when the aircraft 300 is performing taxi operations and when the aircraft 300 is on ground; switch the output of the SVS taxi mode exocentric view 202 to output, to the at least one display 402, the SVS flight mode egocentric view 102 when the aircraft 300 is performing taxi operations and when the aircraft 300 is on ground based at least on the user input to switch from the SVS taxi mode exocentric view 202 to the SVS flight mode egocentric view 102; and/or switch the output of the SVS flight mode egocentric view 102 back to the SVS taxi mode exocentric view 202 once the duration of the user input is complete.

In some embodiments, the switch (e.g., the momentary switch 312) may be a physical device in the cockpit, such as a spring-operated button or toggle that engages when pushed or pressed and disengages when released. In some embodiments, the momentary switch 312 may be a dedicated device that is used solely for performing the necessary PFD flight check or may be a device that controls more than one flight deck function depending on the operational context (commonly referred as "overloading"). In some embodiments, the switch (e.g., the momentary switch 312) may be a display icon (e.g., on the display 402 or another display) that is selected, such as with a cursor control device, where the crew may press and hold on the icon to perform the operational check while the PFD image is switched from the SVS taxi mode exocentric view 202 to the SVS flight mode egocentric view 102. In some embodiments, the switch (e.g., the momentary switch 312) may be a display icon on a touch screen display (e.g., the display 402) where the crew may press and hold on the icon to perform the operational check. The switch may be configured to interface with a user, receive the user input, and output the user input to one or more of the at least one processor (e.g., 404 and/or 502).

For example, at least one processor (e.g., the at least one processor 404 and/or the at least one processor 502 of the at least one computing device 310) may be configured to: output, to the at least one display 402, an SVS taxi mode exocentric view 202 of an aircraft 300 when the aircraft 300 is performing taxi operations and when the aircraft 300 is on ground; receive a user input (e.g., from the switch (e.g., the momentary switch 312)) to switch the output of the SVS taxi mode exocentric view 202 to an SVS flight mode egocentric view 102 from the aircraft 300; switch the output of the SVS taxi mode exocentric view 202 to output, to the at least one display 402, the SVS flight mode egocentric view 102 when the aircraft 300 is performing taxi operations and when the aircraft 300 is on ground based at least on the user input (e.g., a press and hold event) to switch from the SVS taxi mode exocentric view 202 to the SVS flight mode egocentric view 102; and/or switch the output of the SVS flight mode egocentric view back to the SVS taxi mode exocentric view once the duration of the user input is complete.

For example, the at least one processor 404 (e.g., at least one PFD processor) of the display unit computing device 306 may be configured to execute a PFD application 408. The processor 404 may further be configured to: receive sensor data from the sensors 308; receive an auto or off selection from the user interface 304 for a SVS taxi mode; output a scene selection to at least one SVS processor instructing the SVS processor to generate the SVS taxi mode exocentric view 202 or the SVS flight mode egocentric view 102; and/or receive the SVS taxi mode exocentric view 202 or the SVS flight mode egocentric view 102 from the at least one SVS processor.

For example, the at least one processor 502 (e.g., at least one SVS processor) of the computing device 310 (e.g., an SVS computing device) may be configured to execute an SVS application. The processor 502 (e.g., an SVS processor) may further be configured to: receive sensor data from the sensors 308; receive the scene selection from the at least one PFD processor 404; and/or output the SVS taxi mode exocentric view 202 or the SVS flight mode egocentric view 102 to the at least one PFD processor 404.

At least one processor (e.g., the at least one processor 404 and/or the at least one processor 502 of the aircraft 300 may be configured to perform (e.g., collectively perform) any or all of the operations disclosed throughout.

Figure 6:
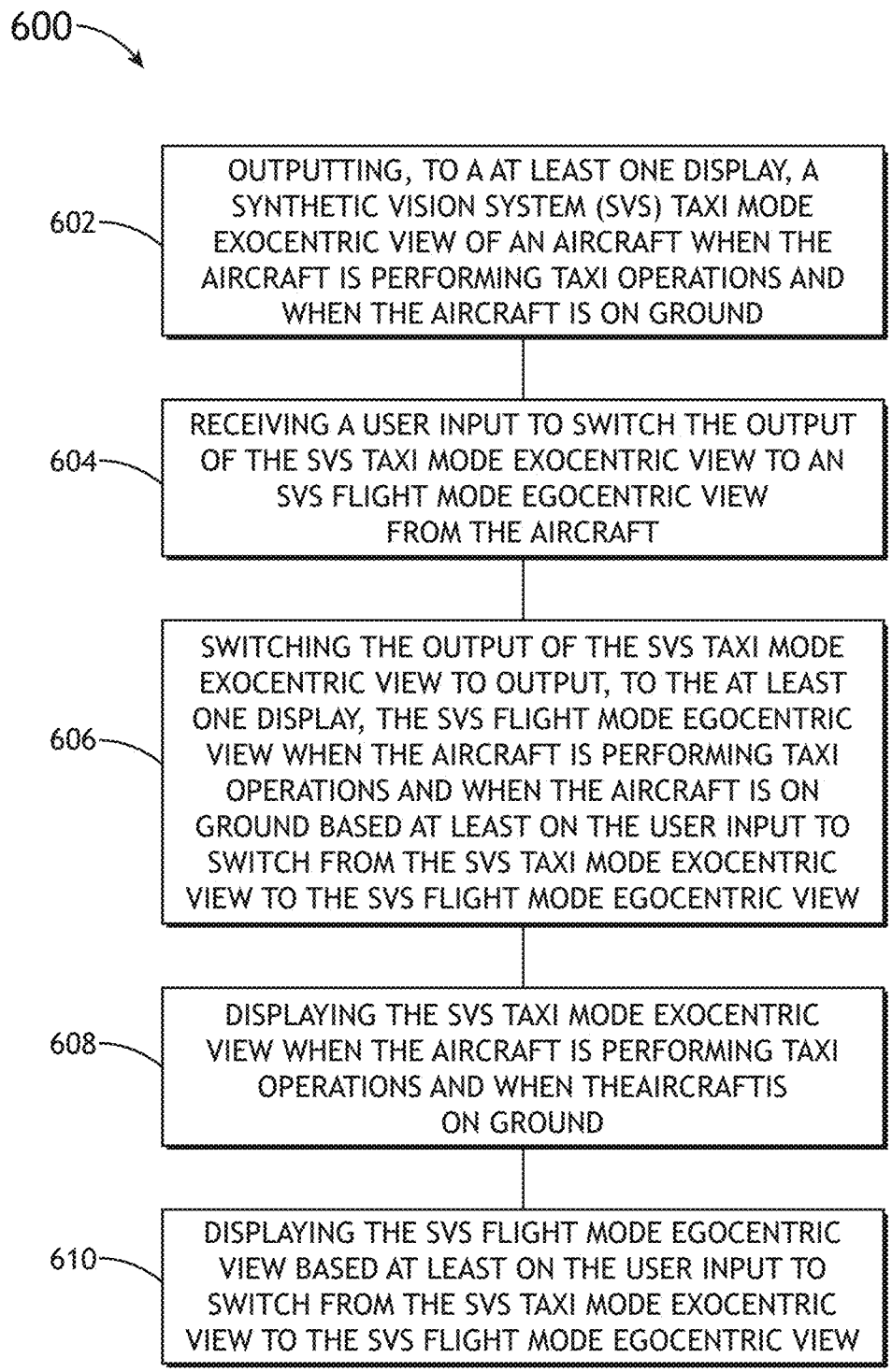
FIG. 6 is a diagram of an exemplary embodiment of a method according to the inventive concepts disclosed herein.

Referring now to FIG. 6, an exemplary embodiment of a method 600 according to the inventive concepts disclosed herein may include one or more of the following steps. Additionally, for example, some embodiments may include performing one or more instances of the method 600 iteratively, concurrently, and/or sequentially. Additionally, for example, at least some of the steps of the method 600 may be performed in parallel and/or concurrently. Additionally, in some embodiments, at least some of the steps of the method 600 may be performed non-sequentially.

A step 602 may include outputting, to at least one display, a synthetic vision system (SVS) taxi mode exocentric view of an aircraft when the aircraft is performing taxi operations and when the aircraft is on ground.

A step 604 may include receiving a user input to switch the output of the SVS taxi mode exocentric view to an SVS flight mode egocentric view from the aircraft.

A step 606 may include switching the output of the SVS taxi mode exocentric view to output, to the at least one display, the SVS flight mode egocentric view when the aircraft is performing taxi operations and when the aircraft is on ground based at least on the user input to switch from the SVS taxi mode exocentric view to the SVS flight mode egocentric view.

A step 608 may include displaying the SVS taxi mode exocentric view when the aircraft is performing taxi operations and when the aircraft is on ground.

A step 610 may include displaying the SVS flight mode egocentric view based at least on the user input to switch from the SVS taxi mode exocentric view to the SVS flight mode egocentric view.

Further, the method 600 may include any of the operations disclosed throughout.

As will be appreciated from the above, embodiments of the inventive concepts disclosed herein may be directed to a system and a method configured to display an SVS taxi mode exocentric view when an aircraft is performing taxi operations and when the aircraft is on ground and to display an SVS flight mode egocentric view based at least on a user input to switch from the SVS taxi mode exocentric view to the SVS flight mode egocentric view.

As used throughout and as would be appreciated by those skilled in the art, "at least one non-transitory computer-readable medium" may refer to as at least one non-transitory computer-readable medium (e.g., memory 406, memory 504, storage 410, and/or storage 506; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
   at least one display; and
   at least one processor communicatively coupled to the display, the at least one processor configured to:
      output, to the at least one display, a synthetic vision system (SVS) taxi mode exocentric view of an aircraft when the aircraft is performing taxi operations and when the aircraft is on ground;
      receive, from a user of the aircraft, an auto selection of an auto or off selection for a SVS taxi mode, wherein the auto selection of the SVS taxi mode enables the at least one processor to automatically transition between the SVS taxi mode exocentric view and an SVS flight mode egocentric view except for a duration of any user input causing the at least one processor to switch the output of the SVS taxi mode exocentric view to output, to the at least one display, the SVS flight mode egocentric view for the duration of any such user input;
      receive a user input to switch the output of the SVS taxi mode exocentric view to the SVS flight mode egocentric view from the aircraft;
      switch the output of the SVS taxi mode exocentric view to output, to the at least one display, the SVS flight mode egocentric view for a duration of the user input when the aircraft is performing taxi operations and when the aircraft is on ground based at least on the user input to switch from the SVS taxi mode exocentric view to the SVS flight mode egocentric view; and
      switch the output of the SVS flight mode egocentric view back to the SVS taxi mode exocentric view once the duration of the user input is complete,
   wherein the at least one display is configured to: display the SVS taxi mode exocentric view when the aircraft is performing taxi operations and when the aircraft is on ground; and display the SVS flight mode egocentric view based at least on the user input to switch from the SVS taxi mode exocentric view to the SVS flight mode egocentric view,
   wherein the SVS taxi mode exocentric view has an eyepoint above and behind the aircraft,
   wherein primary flight display symbology is overlaid on the SVS flight mode egocentric view.

2. The system of claim 1, wherein the user input is a press and hold event.

3. The system of claim 1, wherein the SVS taxi mode exocentric view includes an outline of the aircraft.

4. The system of claim 1, wherein less of the primary flight display symbology is overlaid on the SVS taxi mode exocentric view.

5. The system of claim 1, wherein the at least one processor is further configured to receive, from the user of the aircraft, an off selection of the auto or off selection for the SVS taxi mode, wherein the off selection of the SVS taxi mode enables the at least one processor to only output the SVS flight mode egocentric view.

6. The system of claim 1, wherein the at least one processor comprises: at least one primary flight display (PFD) processor configured to execute a PFD application and at least one SVS processor configured to execute an SVS application.

7. The system of claim 6, wherein the at least one PFD processor is further configured to: receive sensor data from sensors; receive an auto or off selection for a SVS taxi mode; output a scene selection to the at least one SVS processor instructing the SVS processor to generate the SVS taxi mode exocentric view or the SVS flight mode egocentric view, and receive the SVS taxi mode exocentric view or the SVS flight mode egocentric view from the at least one SVS processor.

8. The system of claim 7, wherein the at least one SVS processor is further configured to: receive the sensor data from the sensors; receive the scene selection from the at least one PFD processor; and output the SVS taxi mode exocentric view or the SVS flight mode egocentric view to the at least one PFD processor.

9. The system of claim 1, further comprising a switch configured to interface with a user, receive the user input, and output the user input to one or more of the at least one processor.

10. The system of claim 1, wherein the at least one display and the at least one processor are implemented on the aircraft.

11. A method, comprising:
   outputting, to at least one display, a synthetic vision system (SVS) taxi mode exocentric view of an aircraft when the aircraft is performing taxi operations and when the aircraft is on ground;
   receiving, from a user of the aircraft, an auto selection of an auto or off selection for a SVS taxi mode, wherein the auto selection of the SVS taxi mode enables the at least one processor to automatically transition between the SVS taxi mode exocentric view and an SVS flight mode egocentric view except for a duration of any user input causing the at least one processor to switch the output of the SVS taxi mode exocentric view to output, to the at least one display, the SVS flight mode egocentric view for the duration of any such user input;
   receiving a user input to switch the output of the SVS taxi mode exocentric view to the SVS flight mode egocentric view from the aircraft;
   switching the output of the SVS taxi mode exocentric view to output, to the at least one display, the SVS flight mode egocentric view for a duration of the user input when the aircraft is performing taxi operations and when the aircraft is on ground based at least on the user input to switch from the SVS taxi mode exocentric view to the SVS flight mode egocentric view;
   switching the output of the SVS flight mode egocentric view back to the SVS taxi mode exocentric view once the duration of the user input is complete;

displaying the SVS taxi mode exocentric view when the aircraft is performing taxi operations and when the aircraft is on ground; and displaying the SVS flight mode egocentric view based at least on the user input to switch from the SVS taxi mode exocentric view to the SVS flight mode egocentric view, wherein the SVS taxi mode exocentric view has an eyepoint above and behind the aircraft, wherein primary flight display symbology is overlaid on the SVS flight mode egocentric view.

\* \* \* \* \*